Figure 1:
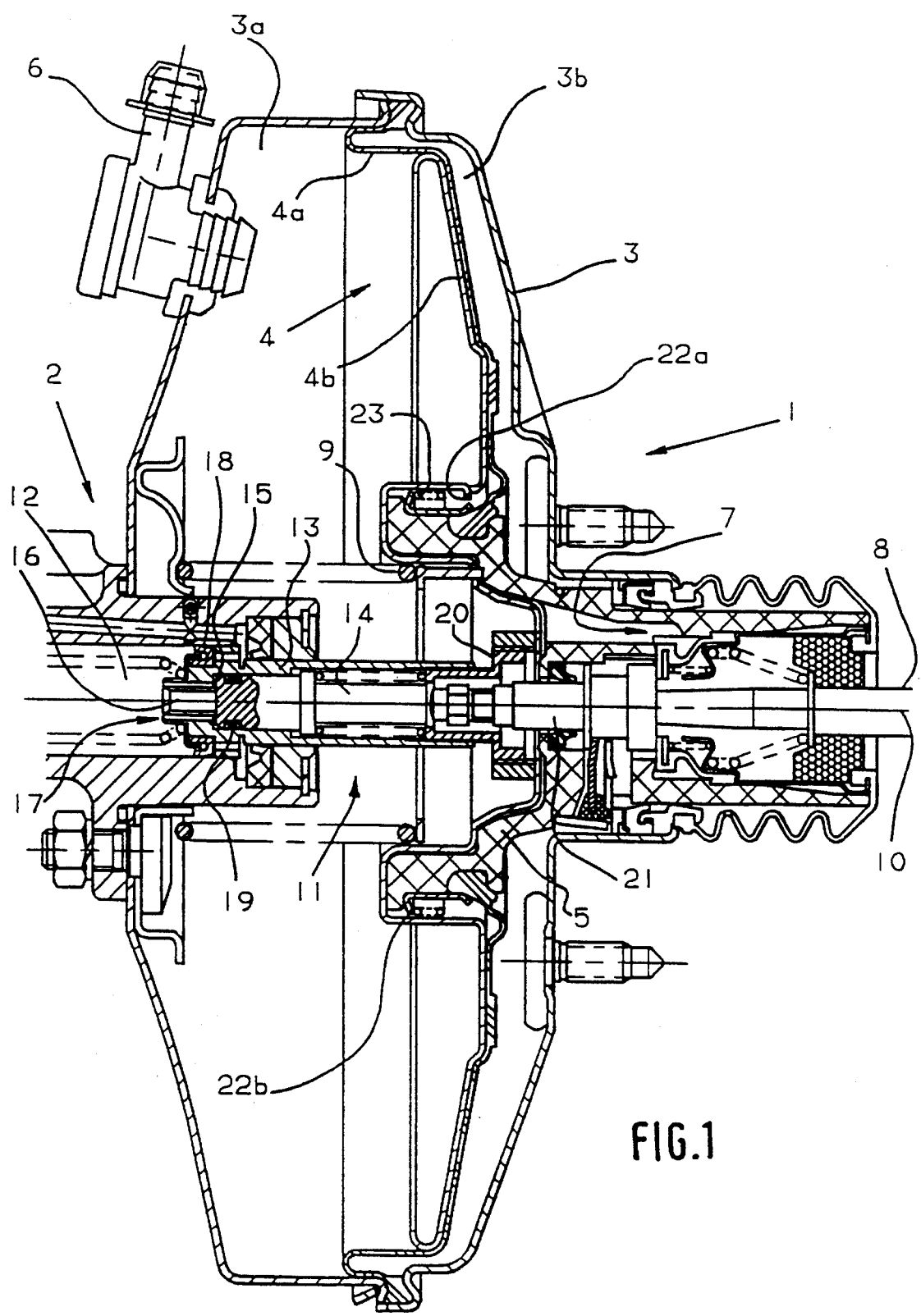

United States Patent [19]
Gautier et al.

[11] Patent Number: 5,475,978
[45] Date of Patent: Dec. 19, 1995

[54] BOOSTER BRAKE DEVICE WITH CONCEALED TRAVEL

[75] Inventors: Jean Pierre Gautier; Ulysse Verbo, both of Aulnay-Sous-Bois; Miguel Perez Revilla, Argenteuil; Roland Levrai, Stains, all of France

[73] Assignee: AlliedSignal Europe Services Techniques, Drancy, France

[21] Appl. No.: 122,553

[22] Filed: Sep. 30, 1993

[30] Foreign Application Priority Data

Sep. 30, 1992 [FR] France ................................ 92 11623
Jan. 21, 1993 [FR] France ................................ 93 00571

[51] Int. Cl.⁶ .................... B60T 13/565; B60T 13/569
[52] U.S. Cl. .................... 60/553; 91/369.2; 91/377; 60/547.1
[58] Field of Search .................... 60/547.1, 550, 60/551, 552, 553; 91/369.1, 372, 376 R, 377, 369.2

[56] References Cited

U.S. PATENT DOCUMENTS

| | | | |
|---|---|---|---|
| 3,222,868 | 12/1965 | Stelzer | 60/551 |
| 3,293,849 | 12/1966 | Smith | 60/553 |
| 3,350,882 | 11/1967 | Leising | 60/553 |
| 3,387,455 | 6/1968 | Eggstein | 60/553 |
| 3,613,506 | 10/1971 | Kytta | 91/376 R X |
| 4,110,985 | 9/1978 | Gordon et al. | 60/550 X |
| 4,172,364 | 10/1979 | Young | 60/553 X |

*Primary Examiner*—John E. Ryznic
*Attorney, Agent, or Firm*—Larry J. Palguta; Leo H. McCormick, Jr.

[57] ABSTRACT

This boosted brake device comprises a pneumatic brake booster (1) associated with a master cylinder (2), the booster operating according to a hydraulic reaction principle and comprising a movable pneumatic piston (5) carrying a control valve (7) actuated by a rod (8), as well as a partition (4) which can move under the effect of a pressure difference and which develops a boost force.

The movable wall (4) is mounted slidingly with respect to the pneumatic piston (5) in order to act early on the master cylinder.

The device of the invention allows greater braking for small values of the travel of the control rod.

6 Claims, 4 Drawing Sheets

5,475,978

BOOSTER BRAKE DEVICE WITH CONCEALED TRAVEL

This application is a Rule 371 of PCT/FR93/00917 filed on Sep. 22, 1993.

The present invention relates to a boosted brake device for a motor vehicle, comprising, on the one hand, a master cylinder filled with a brake fluid and equipped with a main hydraulic piston intended to receive an actuation force composed of an input force and a booster force both acting in an axial direction, and, on the other hand, a pneumatic booster capable of being activated by applying the said input force to a control rod for opening a valve, in order to exert said actuation force on the main hydraulic piston, the booster comprising a rigid casing separated in leaktight fashion into two chambers by means of at least one movable partition, capable of being stressed by a pressure difference between the two chambers resulting from opening the valve and of driving a pneumatic piston which can move with respect to the casing, carrying said valve and contributing at least to transmitting said booster force, the main hydraulic piston of the master cylinder itself comprises a hollow movable cylinder communicating with the master cylinder, receiving at least part of the booster force, and inside which there slides, in leaktight fashion and in the axial direction, a secondary hydraulic piston capable of receiving at least said input force.

A device of this type is well known in the prior art and is described in, for example, the U.S. Pat. No. 4,491,058 or in document FR-A-2-558126.

Such a braking device has the advantage, resulting from the use of a pneumatic piston which can move with respect to the rigid casing, that the total travel available for the control rod, and therefore for the brake pedal, is relatively long, which constitutes a condition necessary for ensuring optimum control of the deceleration of the vehicle during braking.

However, this condition, although necessary, is not sufficient and this control is lessened in current boosted braking devices by the fact that to obtain the minimum pressure necessary to start braking requires a very long initial travel of the control rod.

The object of the present invention is to allow an optimization of the control, by the driver of a vehicle, of the deceleration of the latter by proposing a boosted braking device with hydraulic reaction capable of exerting a braking force which increases much more evenly, as a function of the travel of the control rod and therefore of the brake pedal, than in current devices.

To this end, the device of the present invention is essentially characterized in that the the movable partition is mounted slidingly on the pneumatic piston so as to be able to slide with respect to it in the direction of the master cylinder from an initial relative position in which it abuts against the pneumatic piston in a direction opppposite that which points towards the master cylinder, and in that this movable partition, when it is stressed by a pressure difference, presses at least indirectly on the movable cylinder in the direction of the master cylinder.

According to a preferred embodiment, elastic means are arranged between the pneumatic piston and the movable partition in order to generate an elastic force opposing the free relative sliding of this movable partition and of this pneumatic piston, these elastic means for example comprising a helical spring.

Figure 2:
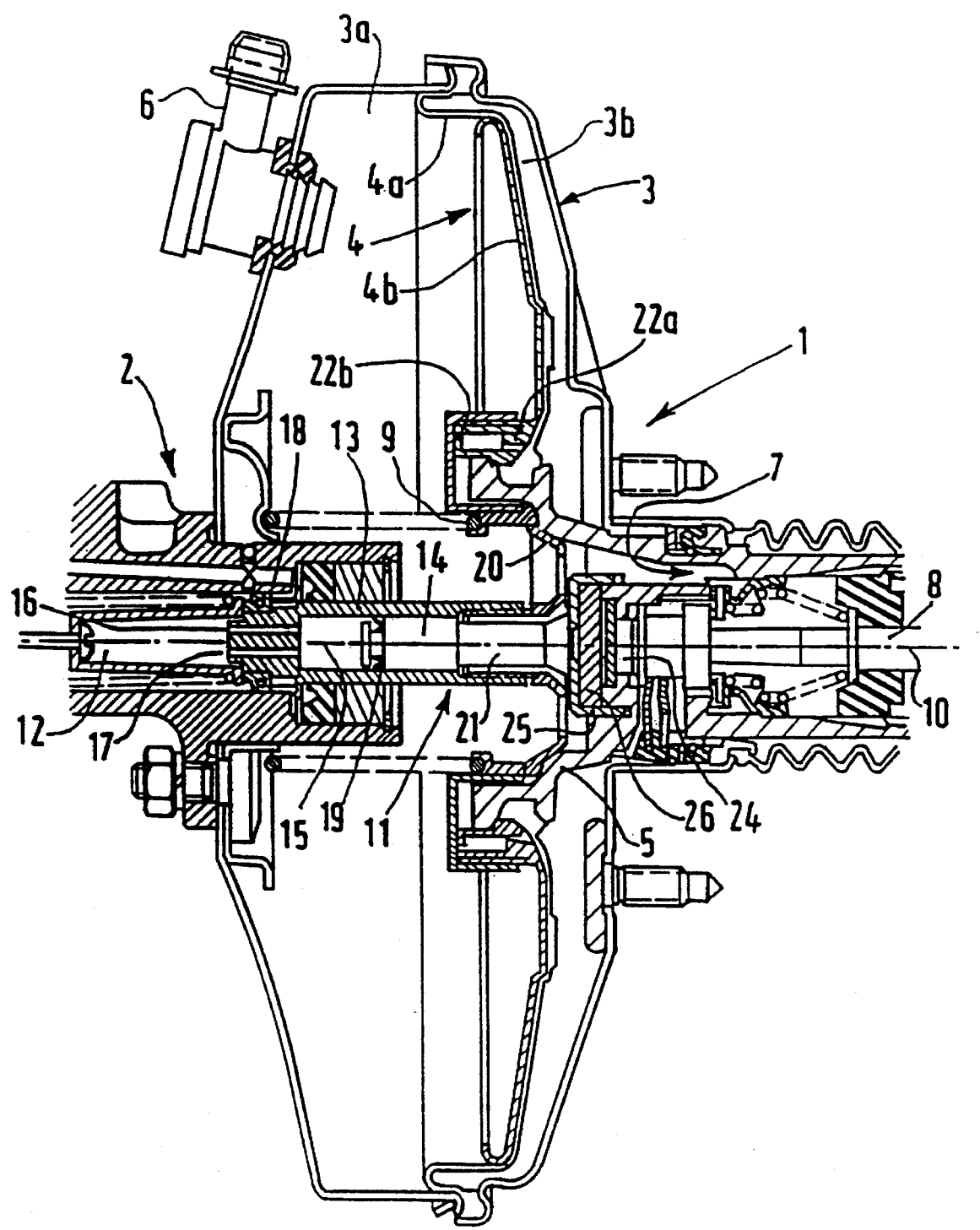
Figure 3:
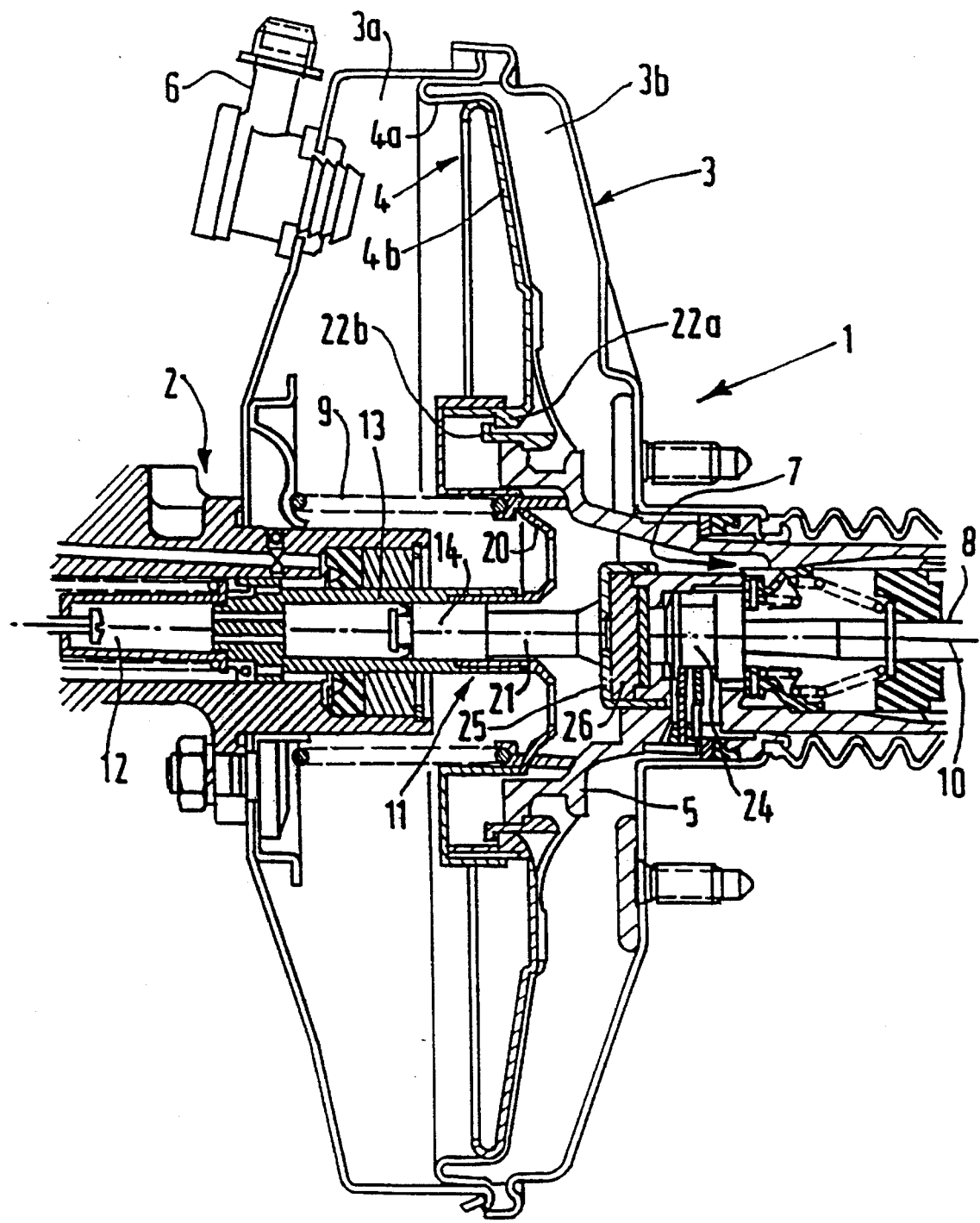
Figure 4:
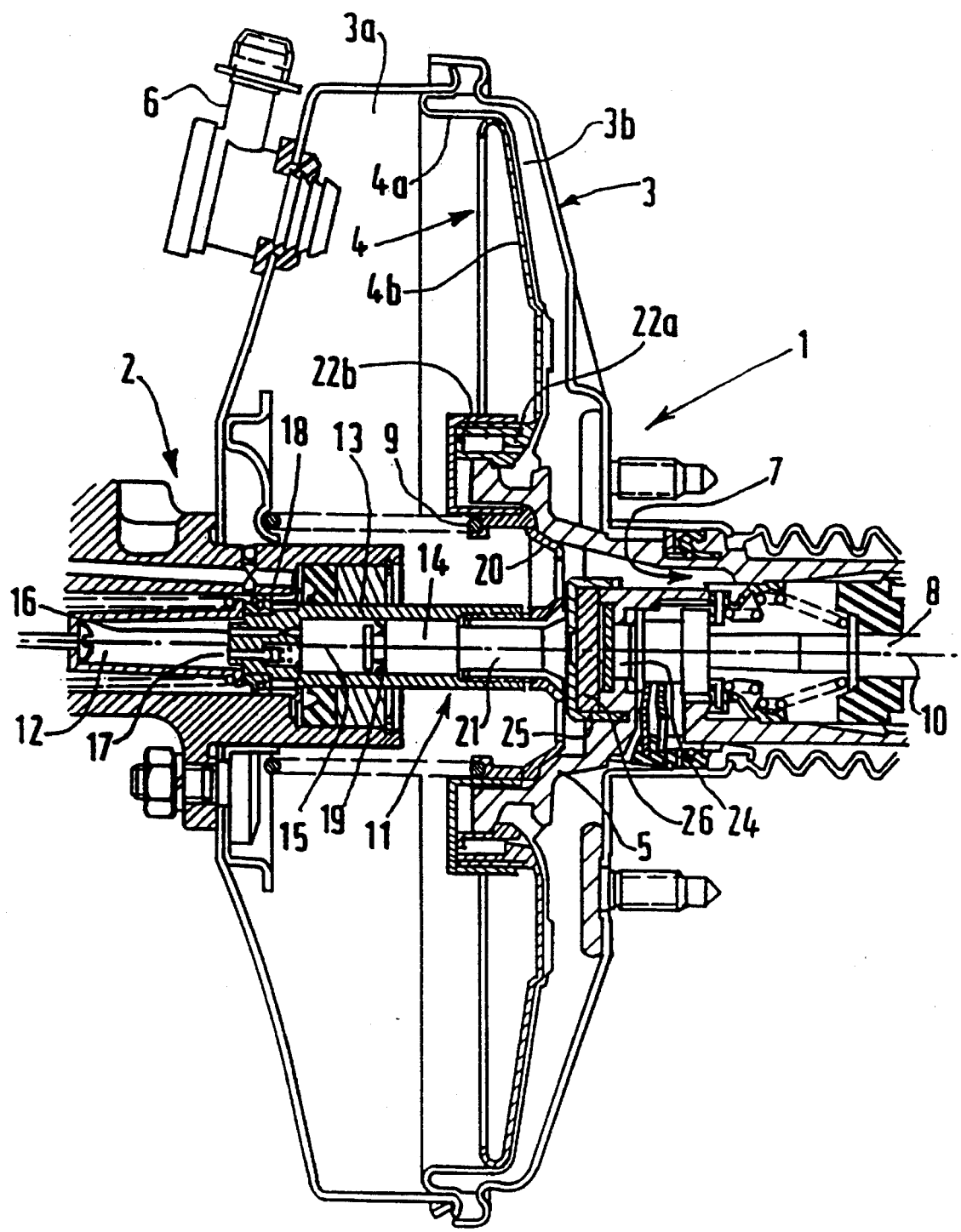

Other features and advantages of the invention will emerge clearly from the description which is given hereinafter, by way of indication and without any limitation, with reference to the accompanying drawings in which:

—FIG. 1 is a view in partial section of a device according to the present invention, —FIGS. 2 and 3 are views in partial section of a device according to a variant of the present invention, and observed at various stages of operation, and —FIG. 4 is a view in partial section of a device according to another variant of the present invention.

Insofar as the invention only relates to an improvement made to braking systems with pneumatic boosting, and the general constitution and operation of the latter are well known to the person skilled in the art, these systems will only be recalled here rapidly to allow total understanding of the improvement which the invention represents.

Diagrammatically, a system of this type comprises a booster 1 and a master cylinder 2.

The booster itself comprises a rigid casing 3 separated into two chambers 3a and 3b in a leaktight fashion, by a movable partition 4 comprising a membrane 4a and a rigid skirt 4b and capable of driving a pneumatic piston 5 which can move inside the casing 3.

The front chamber 3a, whose front face is closed in leaktight fashion by the master cylinder 2, is permanently connected to a vacuum source (not shown) via a non return valve 6.

The pressure in the back chamber 3b is controlled by a three-way valve 7, controlled by a control rod 8 which is connected to a brake pedal (not shown).

When the control rod 8 is in the rest position, in this case pulled towards the right, the valve 7 establishes a communication between the two chambers 3a and 3b of the booster, or comes from a position in which this communication has been established.

Since the back chamber 3b is therefore subjected to the same vacuum as the front chamber 3a, the piston 5 is pushed back towards the right, into the rest position, by a spring 9.

Actuation of the control rod 8 towards the left has the effect, in a first instance, of moving the valve 7 so that it isolates the chambers 3a and 3b from one another, then, in a second instance, of moving this valve so that it opens the back chamber 3b to atmospheric pressure.

The pressure difference between the two chambers therefore sensed by the membrane 4a exerts a thrust on the movable partition 4 which tends to move it towards the left and allow it to drive the piston 5 which in turn moves, thereby compressing the spring 9.

The braking effort exerted on the control rod 8, or "input force", and the brake boost effort, or "boost force" resulting from the thrust of the movable partition 4, are therefore applied together along the axis 10 of the thrust rod 8 in the direction of the master cylinder 2, and join together in order to constitute the force for actuating the latter.

More precisely, the actuation force is applied to the main hydraulic piston 11 of the master cylinder and causes it to move towards the left (in the FIG. 1), which leads to a rise in pressure of the brake fluid present in the internal volume 12 of the master cylinder, and an actuation of the brake connected to the latter.

The main hydraulic piston 11 is, in fact, composite and comprises, on the one hand, a movable and hollow cylinder 13 and, on the other hand, a secondary hydraulic piston 14.

The internal volume 15 of the movable cylinder 13 communicates with the internal volume 12 of the master cylinder by means of openings, such as 16 and 17, made in the movable cylinder in an axial direction.

Apart from the passage of fluid which these openings 16 and 17 allow between the internal volume 12 of the master cylinder 2 and that of the movable cylinder 13, this movable cylinder 13 slides in leaktight fashion in the master cylinder 3, leaktightness being obtained by virtue at least of an annular seal 18.

The secondary hydraulic piston 14, for its part, slides inside the movable cylinder 13, which it blocks off in leaktight fashion by virtue of an annular seal 19.

The movable cylinder 13 is connected, via the ring 20, to the rigid skirt 4b so as to receive at least part of the boost force exerted by means of this skirt.

The secondary hydraulic piston 14 is arranged axially, facing a thrust rod 21 capable of transmitting to it at least the input force exerted on the control rod 8.

The operation of the device described up until now is as follows.

When an input force is applied to the control rod 8, after a predetermined travel of this control rod 8, the valve 7 opens the back chamber 3b of the booster, previously isolated from the front chamber 3a, to the atmosphere, and a boost force is applied to the movable cylinder 13 by the rigid skirt 4b via the ring 20.

Such a predetermined travel of the control rod 8 is made possible by the provision of a certain play between the forward end of the trust rod 21 and the rearward end of the secondary hydraulic piston, permanently biased toward the master cylinder by a spring disposed between a shoulder of the ring 20 and a shoulder of the secondary hydraulic piston 14.

The hydraulic pressure in the internal volume 12 of the master cylinder rises and becomes established, by a flow of hydraulic fluid through the openings 16 and 17, in the internal volume 15 of the movable cylinder, thus causing a reaction force to appear on the secondary hydraulic piston 14, depending on the boost force, opposing the input force, and therefore allowing the first force to be controlled by the second.

According to the invention, the movable partition 4 is, preferably by means of its rigid skirt 4b, mounted slidingly on the pneumatic piston 5 and can slide with respect to it in the direction of the master cylinder 2, from a rest position corresponding to the rest position of the booster, represented in the FIG. 1, and in which the skirt 4b comes into abutment against the pneumatic piston 5 under the effect of the return springs of the master cylinder 2 in a direction opposite that which points towards the master cylinder 2.

On the other hand, the skirt 4b and the pneumatic piston 5 have respective stops 22a, 22b facing one another, allowing the skirt 4b only to drive the pneumatic piston 5 after a certain travel, and possibly allowing trapping of a helical spring 23 or any other elastic means tending to prevent a free sliding of this skirt on this pneumatic piston over the entire length of the movement possible between these two components, and a sharp driving of one by the other.

By virtue of these features, the brake device of the invention makes it possible to obtain, within the master cylinder 2, a relatively high pressure with respect to those which are typically obtained in known devices, for any low-amplitude travel of the control rod 8.

This effect may be explained in the following way.

The boost force developed by the booster depends on the pressure difference between the chambers 3a and 3b, the latter itself being dependent on the opening of the valve 7.

The opening of this valve depends on the relative movement between the control rod 8 and the pneumatic piston 5, which is itself also movable and carries the valve 7.

By allowing the movable partition 4 to move, at the beginning of the operation of the booster, forwards towards the master cylinder 2, and therefore to increase the internal pressure of the fluid present in the latter, without totally and immediately driving the pneumatic piston 5, the invention allows the relative movement of the control rod 8 with respect to this piston 5 to approximate to the absolute movement of this rod 8 referenced with respect to a fixed point in space, from which there results, with an equal travel for the control rod 8, the appearance of a higher pressure in the master cylinder 2.

When the stops 22a and 22b are contacting each other, there is no more, as the booster is further operated, relative movement between the skirt 4b and the piston 5, which then move together as they do in a conventional booster, while keeping a pressure difference in the master-cylinder 2 relative to prior art.

It can then be seen that the invention provides a boosted brake device in which part of travel of the skirt 4b and of the main hydraulic piston 11 of the master cylinder is concealed relative to the travel of the control rod 8, giving rise in operation to a higher pressure in the master cylinder.

Another important advantage provided by the invention lies in the fact that the ring 20, interposed between the rigid skirt 4b and the movable cylinder 13, allows by way of its adjustment, for example by screwing or unscrewing, to vary the distance at rest between the forward end of the thrust rod 21 and the rearward end of the secondary hydraulic piston 14, and thus to adjust the jump value of the booster, which is an important parameter of its operation.

FIGS. 2 and 3 show two operative positions of a booster according to a variant of the embodiment described above. On these figures, the elements identical or analogous to those of FIG. 1 have the same numeral references.

According to this variant, the secondary hydraulic piston 14 consists of the axial extension of the trust rod 21 capable of transmitting to it, on the one hand, the input force exerted on the control rod 8 and, on the other hand, a fraction of the booster force developed by the pneumatic piston 5, these forces being transmitted, in a fashion known per se, by means of a reaction disk 26, on one face of which there bear this pneumatic piston and a feeler 24 which is actuated by the control rod, and whose other face bears on a cup 25 which is securely fastened to the trust rod 21.

The operation of this booster is quite similar to that of the booster of FIG. 1: when an input force is applied to the control rod 8, after a predetermined travel of the control rod 8, the valve 7 opens the back chamber 3b of the booster, previously isolated from the front chamber 3a, to the atmosphere, and a boost force is applied to the movable cylinder 13 by the rigid skirt 4b via the ring 20.

The hydraulic pressure in the internal volume 12 of the master cylinder clearly rises and becomes established, by a flow of hydraulic fluid through the passages 16 and 17, in internal volume 15 of the movable cylinder, thus causing a reaction force to appear on the secondary hydraulic piston 14, depending on the boost force, opposing the force transmitted via the reaction disc 26, and allowing the booster force to be controlled by the input force, by means of a combined reaction, that is to say simultaneously hydraulic and mechanic.

As previously described, the movable partition 4 is, preferably by means of its rigid skirt 4b, mounted slidingly on the pneumatic piston 5 and can slide with respect to it in the direction of master cylinder 2.

More precisely, the relative sliding takes place from a rest position corresponding to the rest position of the booster, as represented in FIG. 2, and in which the skirt 4b comes into abutment against the pneumatic piston 5, in this case via the ring 20, under the effect of the return springs of the master cylinder 2 in a direction opposite that which points towards the master cylinder 2, as far as a position represented in FIG. 3 in which the skirt 4*b* drives the pneumatic piston 5 towards the master cylinder.

The respective stops 22*a*, 22*b* facing each other, guarantee that the skirt 4*b* will only drive the pneumatic piston 5 after a predetermined relative travel corresponding to the distance which separates these stops at rest.

This variant of embodiment also makes it possible to obtain, within the master cylinder 2, a relatively high pressure with respect to those which are typically obtained in known devices, for any low-amplitude travel of the control rod 8 and using a reaction disc.

FIG. 4 shows another variant of embodiment of the invention, which may be used on the booster described on FIG. 1 as well as on the booster described on FIGS. 2 and 3.

Indeed, upon actuation of the brake device, it has been shown that, after a first operative stage, the assembly rigid skirt 4*b*—pneumatic piston 5 moves leftwards (when seeing the drawings) as a whole, in the relative position shown on FIG. 3, the pressure in the rear chamber 3*b* increasing progressively.

When this pressure equals the atmospheric pressure, the booster operates in a so called saturation phase and the booster force increases no more and remains constant, whilst the input force is capable to be still increased by the vehicle's driver.

It follows that, at the beginning of that saturation phase, the balance of the forces shows that any increase of the input force on the control rod 8 results only in a forward movement of the pneumatic piston 5 and in a backward movement of the rigid skirt 4*b*, until they come into mutual contact, in such a way that the pneumatic piston 5 drives the skirt 4*b* towards the master cylinder.

During the travel of the piston 5, and hence of the control rod 8 and of the brake pedal which is connected to it, no pressure increase has occured in the internal volume 12 of the master cylinder. This phenomenon may be felt unpleasantly by the driver, and the variant illustraded on FIG. 4 overcomes this phenomenon.

It may be seen on FIG. 4 that the internal volume 15 of the movable cylinder 13 communicates with the internal volume 12 of the master cylinder 2 through at least one fluid flow decelerating orifice, such as a flow rate restrictor disposed in the opening 16, and through at least one non return valve, for example, disposed in the opening 17, which only allows brake fluid to flow from the master cylinder towards the movable cylinder.

The assembly restrictor—non return valve thus constitutes a selective flow rate reducer, without any noticeable effect on the operation of the booster before the saturation phase, but which allows, at the beginning of this latter, to move forward the movable cylinder 13 when the pneumatic piston moves forward, and thus to obtain a continuous pressure increase in the master cylinder, when the vehicle's driver keeps on pressing on the brake pedal.

We claim:

1. A boosted brake device for a motor vehicle, comprising a master cylinder filled with a brake fluid and having a main hydraulic piston intended to receive an actuation force composed of an input force and a booster force both acting in an axial direction, and a pneumatic booster capable of being activated by applying the input force to a control rod for opening a valve in order to exert the actuation force on the main hydraulic piston, the booster comprising a rigid casing separated in leaktight fashion into two chambers by means of at least one movable partition, capable of being stressed by a pressure difference between the two chambers resulting from opening the valve and of driving a pneumatic piston which can move with respect to the casing, carrying said valve and contributing at least to transmitting said booster force, the main hydraulic piston of the master cylinder comprising a hollow movable cylinder communicating with the master cylinder, receiving at least part of the booster force, and inside which slides, in leaktight fashion and in the axial direction, a secondary hydraulic piston capable of receiving at least said input force, characterized in that the movable partition is mounted slidingly on the pneumatic piston so as to be able to slide with respect to the pneumatic booster in the direction of the master cylinder from an initial relative position in the movable partition which abuts against the pneumatic piston in a direction opposite from the master cylinder, and in that the movable partition, when stressed by a pressure difference, presses at least indirectly on the movable cylinder in the direction of the master cylinder.

2. The brake device according to claim 1, characterized in that elastic means are arranged between the pneumatic piston and the movable partition to generate an elastic force opposing free relative sliding of the movable partition and of the pneumatic piston.

3. The brake device according to claim 1, characterized in that adjustable means is interposed between the movable partition and the movable cylinder for adjusting a jump value of the booster.

4. The brake device according to claim 2, characterized in that the movable cylinder communicates with the master cylinder through at least one fluid flow decelerating orifice and through at least one non-return valve which allows only brake fluid to flow from the master cylinder towards the movable cylinder.

5. The brake device according to claim 1, wherein said input force is transmitted by means of a reaction disk on which said pneumatic piston also bears to supply at least part of said booster force, characterized in that the main hydraulic piston of the master cylinder comprises a hollow movable cylinder which communicates with the master cylinder, which interacts with the movable partition to receive at least part of the booster force communicated by the latter, and inside which slides, in leaktight fashion and in the axial direction, a secondary hydraulic piston capable of receiving said input force, and said at least part of the booster force from the reaction disk, and in that the movable partition is mounted slidingly on the pneumatic piston to be able to slide with respect to the pneumatic piston over a predetermined travel in the direction of the master cylinder from an initial relative position in which it abuts against the pneumatic piston in a direction opposite from the master cylinder as far as a final position in which the movable partition can drive the movable cylinder in the direction of the master cylinder.

6. The brake device according to claim 5, characterized in that the movable cylinder communicates with the master cylinder through at least one fluid flow decelerating orifice and through at least one non-return valve which only allows brake fluid to flow from the master cylinder towards the movable cylinder.

\* \* \* \* \*